United States Patent Office 3,482,452
Patented Dec. 9, 1969

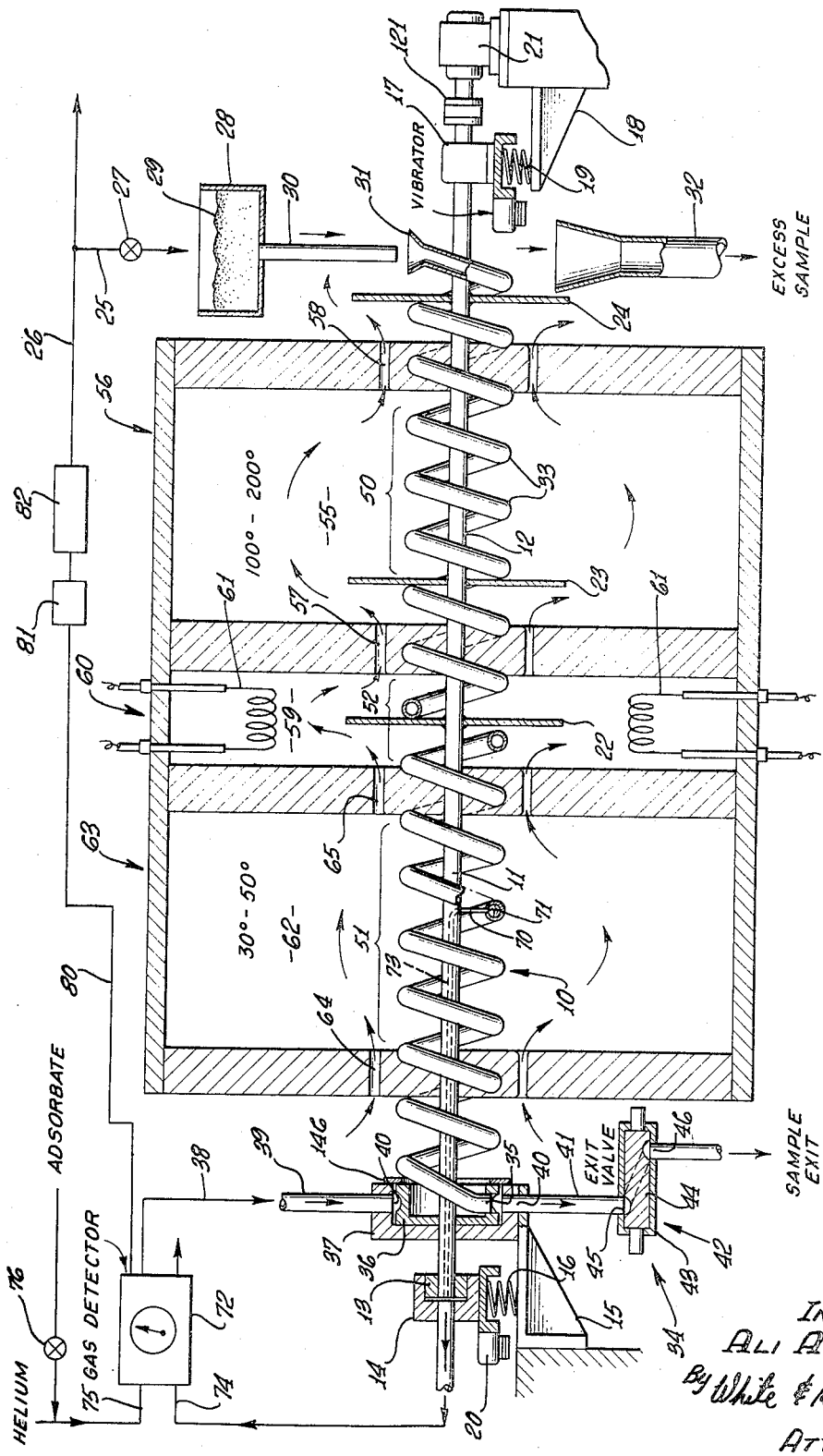

3,482,452
APPARATUS AND METHOD FOR MONITORING SURFACE AREA OF FLOWING COMMINUTED MATERIAL
Ali A. Tabikh, Riverside, Calif., assignor to California Portland Cement Company, Los Angeles, Calif., a corporation of California
Filed Aug. 8, 1966, Ser. No. 570,806
Int. Cl. G01f *15/14;* G01k *1/08;* G01j *5/04*
U.S. Cl. 73—432                                    24 Claims

ABSTRACT OF THE DISCLOSURE

A method of determining the surface area of a comminuted material including the steps of degassing the sample with purge gas, subjecting the sample to a fluid adsorbate, and determining the amount of adsorbate adsorbed which is a function of surface area. The treatment stages are carried out in separate zones and the sample is passed through these zones by rotating and vibrating a spiral sample feed duct.

---

This invention relates generally to determining surface properties of material, and more particularly concerns apparatus and methods for monitoring surface area of comminuted material, as for example cement.

In the processing of materials subjected to fine grinding it is very desirable to have accurate knowledge of the surface area of the ground material in order that such grinding may be controlled. For example, if the surface area of ground cement clinker is too high, the fineness of grinding should be reduced and vice versa.

Surface area determinations in the past have typically involved measuring the amount of gas adsorbed on a solid surface at temperature close to the boiling point of the gas, nitrogen for example being a commonly used adsorbate. In this method, the amount of adsorbed gas is usually determined by measuring pressure differences, and then the well known Brunauer-Emmett-Teller (BET) equation can be used in the calculation of surface area. However, the adsorption measurements have involved undesirably complex equipment and techniques, as for example high vacuum, low temperature apparatus and the methods are extremely time-consuming requiring several hours for obtaining surface area determinations. These disadvantages and particularly the excessive time requirement have prevented practical application of such techniques to on-stream processes where knowledge of surface area of powder in a process stream must be obtained very rapidly for proper process control.

The present invention has as its major object the provision of apparatus and method to continously monitor and determine surface area properties of powdery materials, characterized by the principle of isolating the solid particulate material from ambient atmospheric conditions in an enclosed and controlled environment, causing the physical property or properties of the material to approach a state of equilibrium with its isolated environment, and then performing the desired measurements or treatment to determine the surface property of the material. This is typically accomplished while the material is flowing through a treatment system and in such manner as to provide for continuous monitoring of a small side stream of "on-line" process material.

The above object is realized in an unusually advantageous method, the steps of which include subjecting a sample of the comminuted material to progressive treatment stages and travel, those stages including effecting degassing of the sample, and effecting adsorption by the degassed sample of fluid adsorbate. Travel of the sample is typically effected by its placement within a spiral duct subjected to vibration, and by rotating that duct. Further, the stages of treatment are carried out in separate zones maintained essentially closed but yet intercommunicating during treatment of the traveling sample. As will be seen, the degassing step is effected by passing purge gas in contact with the sample traveling in a first zone maintained at elevated temperature; the adsorption step is effected by passing gaseous adsorbate in contact with the sample traveling in a second zone and maintained at elevated temperature; detection of adsorbate adsorption by the sample that travels in the second zone is carried out by quantitatively detecting adsorbate detrainment from carrier gas, a side stream of carrier gas and adsorbate being removed from the second zone for subjection to such detection; and the sample is transferred from the second zone only after it has reached near equilibrium with respect to adsorbate adsorption. Further, the sample typically consists of the product produced upon grinding the clinker discharge from a cement kiln, but may consist of other powdery materials.

In its basic apparatus aspects, the invention includes passage means forming treatment zones for receiving a traveling sample of the material to be subjected to progressive treatment, means to effect degassing of the sample traveling in a first treatment zone, means to effect adsorption by the degassed sample of fluid adsorbate traveling in a second zone, and means to determine the degree of fluid adsorbate adsorption. More specifically, the passage means typically includes a spiral duct forming at least one treatment zone, to be subjected to vibration for promotion of sample advancement in the duct; the duct is typically rotated about a horizontal axis to promote sample advancement; the passage means typically includes structure to transfer the sample between the first and second zones; the degassing effecting means includes means to heat the sample traveling in the first zone and to pass purge gas in contact with the sample; the adsorption effecting means may include apparatus to cool the sample traveling in the second zone and to pass gaseous adsorbate in contact with the sample therein; and a line communicates with the spiral duct to remove a side stream of adsorbate from the second zone, there being a detector connected to receive that side stream to quantitatively detect the adsorbate desorbed from the sample.

These and other objects and advantages of the invention, as well as the details of illustrative embodiments, will be more fully understood from the following detailed description of the drawings, in which a side elevation of apparatus usable in accordance with the invention is illustrated.

In FIG. 1 a spiral duct 10 has a generally horizontal axis 11 defined by a shaft 12 upon which the duct 10 is carried for rotation about axis 11. One end of the shaft is supported by a bearing 13 received by a bearing housing 14, the latter being supported on frame part 15 via spring 16. Similarly, the opposite end of the shaft is supported by a bearing received by a housing 17 supported on frame part 18 via spring 19. Vibrators 20 and 21 are operable to vibrate the housings 14 and 17 vertically on the springs, such vibration being communicated to the shaft and duct to aid leftward travel of comminuted sample material in the lowermost portion of duct 10 as the latter rotates. Duct rotation about axis 11 is effected by a drive 20 flexibly coupled at 121 to the shaft 12, to accommodate both rotation and vibration of the shaft and duct. In these regards, the duct passes through and is carried by rotary baffle plates 22–24 to which the shaft is also connected.

Sample material, which may for example consist of the product produced upon grinding the clinker discharge from a cement kiln, is taken as a small side stream 25 from a main stream 26 thereof. A valve 27 controls delivery of the side stream 25 to a hopper 28, in which the sample material collects at 29 and is fed at 30 to a rotating inlet terminal 31 of the spiral duct 10. As the inlet 31 repeatedly rotates into the falling stream of sample material, increments of sample collect in the right end portion of the duct 10, and the excess material falls into a receiver 32. Once in the duct, the sample increments travel leftwardly therein while tending to remain in the lower portions 33 of the duct due to rotation and vibration thereof.

The sample increments remain in the duct until they successively exit at the lock assembly generally indicated at 34. In this regard, the duct terminal 35 rotates along with a rotor 36 in a chamber 37 to the interior of which a gas stream 38 is fed via conduit 39. The annular clearance 40 between the rotor and chamber bore is flooded with intake gas under sufficient pressure to cause the gas to enter the duct via terminal 35 and flow rightwardly in the duct toward the opposite end terminal 31, at which point the gas is vented. Accordingly, the gas flows countercurrently with respect to travel of the sample material in the essentially closed duct. Also, once each revolution of terminal 35, sample material that has arrived at the left end of duct 10 is discharged downwardly and through an outlet 40 in the chamber 37. Such discharged material collects in conduit 41, from which it is periodically removed as by manipulation of the exit valve assembly 42. The latter includes a chamber 43 containing a ported valve plug 44 manipulable to bring chamber inlet 45 and outlet 46 into and out of communication, thereby to control the exit of sample material in such manner as not to effect undesirable release of gas from stream 38 via the outlet 46. Note the seal ring 146 blocking escape of gas from the clearance between rotor 36 and chamber 37.

It will be understood that the duct 10 defines what may be referred to as passage means forming treatment zones for receiving a traveling sample of material to be subjected to successive treatment, a first such zone defined by that portion 50 of the duct 10 associated with means to effect degassing of the sample, and a second such zone defined by that portion 51 of the duct 10 associated with means to effect adsorption by the degassed sample of fluid adsorbate in the second zone. Transfer structure to transfer the sample between the first and second zones may take the form of a third portion 52 of the duct, as indicated.

The degassing effecting means may typically include means to heat the sample traveling in the first zone defined by duct portion 50 and to pass purge gas such as helium or nitrogen in countercurrent relation with the sample therein, as described. Heating of the duct portion 50 and the sample traveling therein is for example effected by heat transfer from hot air flowing rightwardly through the interior 55 of the chamber section 56, the latter having a hot air inlet and outlet 57 and 58. The air is heated as by passing through the interior 59 of adjacent chamber section 60 containing heater coils 61, air flow being indicated by the arrows. In this way, the sample (heated for example to between 100° and 200° C.) is effectively degassed and placed in condition to adsorb fluid adsorbate in the second zone associated with duct portion 51 toward which the sample slowly travels, the purge gas in duct 10 sweeping the gases released from the sample to the right for discharge at terminal 31.

The adsorption effecting means may typically include means to cool the sample traveling in the second zone and to pass gaseous adsorbate in contact with the sample therein. Cooling of the duct portion 51 defining the above referred to second zone is for example effected by heat transfer to cool air flowing rightwardly through the interior 62 of the chamber section 63, the latter having a cool air inlet and outlet at 64 and 65 respectively. Such cool air is subsequently heated in chamber interior 59 as described. Means to pass gaseous adsorbate in contact with the sample in duct portion 51 may typically include inlet conduit 39 communicating with the spiral duct portion 51 to pass a mixture of carrier gas (such as helium) and fluid adsorbate (such as methyl alcohol) to the inlet terminal 35 of the spiral duct 10. The adsorbate is thus caused to flow rightwardly in the duct portion 51 over the cooled sample increments therein, for adsorption. The unadsorbed adsorbate carried rightwardly through duct portion 50 is not significant adsorbed by the sample in that portion due to the elevated temperature at that zone.

Finally, means is provided to determine the degree of fluid adsorbate adsorption, such means typically including a line communicating with the spiral duct to remove a side stream of adsorbate from the second zone, and a detector connected to receive that side stream and to quantitatively detect the adsorbate adsorbed by the sample. One such line is indicated at 70 as bleeding the spiral duct at 71 and returning the bled side stream to detector 72, via a bore 73 in shaft 12. The bled side stream fed to detector 72 is indicated at 74, and the detector also receives the initial mixture of carrier gas and fluid adsorbate, as indicated at 75, for comparison of the differential adsorbate contents of the two streams. A valve 76 controls adsorbate flow to the carrier helium passing to the detector 72.

A suitable gas detector 72 is Model PCK–490, manufactured by Gow Mac Instrument Co. The detector can of course be calibrated to read in terms of the degree of sample particle fineness or comminution, which varies as a function of the amount of adsorbate adsorbed by the sample. The detector may also have an electrical signal output at 80 varying as a function of sample particle fineness. That output is shown connected as an input to the controller 81 for a grinder 82, and in feedback (as for example negative feedback) relation so as to maintain desired control of particle fineness in the main stream discharge 26 of the grinder.

I claim:

1. In the method of determining a surface property of comminuted material, the steps that include subjecting a sample of the material to progressive treatment stages and travel, said treatment stages including effecting degassing of the sample, and effecting adsorption by the degassed sample of fluid adsorbate, said travel being directed through discrete zones wherein said degassing and adsorption occur, and said material consisting of the product produced upon grinding the clinker discharge from a cement kiln.

2. In the method of determining a surface property of comminuted material, the steps that include subjecting a sample of the material to progressive treatment stages and travel, said treatment stages including effecting degassing of the sample, and effecting adsorption by the degassed sample of fluid adsorbate, said travel being effected at least partly in response to vibration communication to the sample.

3. The method of claim 2, in which said travel is effected by placing the sample within a spiral duct subjected to vibration, and rotating said duct.

4. In the method of determining a surface property of comminuted material, the steps that include providing a main stream of said material, removing a portion of said main stream to provide a sample, subjecting said sample of the material to progressive treatment stages and travel, said treatment stages including effecting degassing of the sample, and effecting adsorption by the degassed sample of fluid adsorbate.

5. In the method of determining a surface property of comminuted material, the steps that include subjecting a sample of the material to progressive treatment stages and travel, said treatment stages including effecting degassing of the sample, and effecting adsorption by the degassed sample of fluid adsorbate, said stages of treatment being carried out in separate zones, and including maintaining said zones essentially closed and in intercommunicating relation during said treatment.

6. The method of claim 5, wherein said degassing step is effected by passing purge gas in contact with the sample traveling in a first zone maintained at elevated temperature.

7. The method of claim 6, wherein said adsorption step is effected by passing gaseous adsorbate in contact with the sample traveling in a second zone and maintained at lowered temperature.

8. The method of claim 7, including detecting adsorbate adsorption by the sample that travels in said second zone by quantitatively detecting adsorbate detrainment from carrier gas.

9. The method of claim 8, wherein a side stream of carrier gas and adsorbate is removed from said second zone for subjection to said detection.

10. The method of claim 6, in which said purge gas is selected from the group consisting of helium and nitrogen.

11. The method of claim 8, including the step of transferring the sample from said second zone only after the sample has reached near equilibrium with respect to adsorbate adsorption.

12. In the method of determining a surface property of comminuted material, said material consisting of the product produced upon grinding the clinker discharge from a cement kiln, the steps that include subjecting a sample of the material to progressive treatment stages and travel, said treatment stages including effecting degassing of the sample, and effecting adsorption by the degassed sample of fluid adsorbate.

13. In apparatus for determining a property of comminuted material, passage means forming treatment zones for receiving a traveling sample of said material to be subjected to progressive treatment, means to effect degassing of the sample traveling in a first zone, means to effect adsorption by the degassed sample of fluid adsorbate in a second zone, and means to determine the degree of fluid adsorbate adsorption.

14. The combination as defined in claim 13, in which said passage means includes a spiral duct forming at least one treatment zone, and means to impart vibration to said duct to promote sample advancement therein.

15. The combination as defined in claim 14, in which the duct has a generally horizontal axis, and including means to impart rotation to the duct about said axis.

16. The combination as defined in claim 13, including a main stream of said material, and means to remove a portion of the main stream and to supply said portion to said first zone as said sample.

17. The combination as defined in claim 13, in which said passage means includes transfer structure to transfer the sample between the first and second zones, said structure maintaining the zones in intercommunicating relation.

18. The combination as defined in claim 17, in which the passage means includes a spiral duct forming said zones and said transfer structure.

19. The combination as defined in claim 13 in which said degassing effecting means includes means to heat the sample traveling in said first zone and to pass purge gas in contact with the sample therein.

20. The combination as defined in claim 19, in which said absorption effecting means includes means to cool the sample traveling in the second zone and to pass gaseous adsorbate in contact with the sample therein.

21. The combination of claim 14 in which said means to determine the degree of fluid adsorbate adsorption includes a line communicating with the spiral duct to remove a side stream of adsorbate from the second zone.

22. The combination as defined in claim 21, including a detector connected to receive said side stream to quantitatively detect the adsorbate adsorbed by the sample.

23. The combination as defined in claim 21, including said material consisting of the product produced upon grinding the clinker discharge from a cement kiln.

24. The combination as defined in claim 13, including means to control the fineness of said comminuted material in response to operation of said last named means.

References Cited

UNITED STATES PATENTS

| | | | |
|---|---|---|---|
| 2,960,870 | 11/1960 | Nelson et al. | 73—432 |
| 3,262,319 | 7/1966 | Orr et al. | 73—432 |
| 3,296,530 | 11/1966 | Ayers | 73—432 |

OTHER REFERENCES

Codle, R. D. Particle Size Determination N. Y., Interscience Publishers, 1955, pp. 251–255.

Adsorption Flow Apparatus for Particle Surface Area Determinations, NUMEC Instruments and Controls Corp. May 3, 1965.

LOUIS R. PRINCE, Primary Examiner

J. W. ROSKOS, Assistant Examiner